United States Patent
Farries et al.

(10) Patent No.: US 6,819,872 B2
(45) Date of Patent: *Nov. 16, 2004

(54) MICRO-OPTIC DELAY ELEMENT FOR USE IN A TIME DIVISION MULTIPLEXED SYSTEM

(75) Inventors: Mark Farries, Exeter (GB); Yihao Cheng, Ottawa (CA); Timothy C. Munks, North Granby, CT (US); Paul E. Dunn, North Granby, CT (US); Andrew Finch, Avon, CT (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/431,752

(22) Filed: May 8, 2003

(65) Prior Publication Data

US 2003/0194237 A1 Oct. 16, 2003

Related U.S. Application Data

(63) Continuation-in-part of application No. 09/342,154, filed on Jun. 23, 1999, now Pat. No. 6,607,313.
(60) Provisional application No. 60/378,777, filed on May 8, 2002.

(51) Int. Cl.[7] .................................................. H04J 14/08
(52) U.S. Cl. .................. 398/102; 398/152; 398/65; 398/184; 398/182; 398/183; 398/161; 398/147; 398/79
(58) Field of Search ........................... 398/102, 152, 398/65, 182, 183, 184, 161, 147, 79

(56) References Cited

U.S. PATENT DOCUMENTS 3,752,992 A    8/1973   Fluhr .......................... 250/199
5,069,520 A   12/1991   Calvani et al. ................. 385/1
5,111,322 A    5/1992   Bergano et al. ............. 359/122
5,134,361 A    7/1992   Pillow .......................... 324/96
5,428,697 A    6/1995   Dolfi et al. .................... 385/24
5,491,576 A    2/1996   Bergano ...................... 359/156
5,654,818 A    8/1997   Yao ............................. 359/246
5,703,708 A   12/1997   Das et al. .................... 359/140
6,014,256 A    1/2000   Cheng ......................... 359/495
6,067,180 A    5/2000   Roberts ....................... 359/181
6,122,086 A    9/2000   Djupsjöbacka ............... 359/181
6,256,124 B1   7/2001   Hait ............................ 359/123
6,317,243 B1  11/2001   Price ........................... 359/181
6,360,037 B1 * 3/2002   Riza ............................. 385/22

FOREIGN PATENT DOCUMENTS

EP         1 063 804 A2    12/2000

OTHER PUBLICATIONS

Y. Miyamoto, K. Yonenaga, et al., "104–Tbit/s DWDM Transmission Experiment Based on Alternate–polarization 80–Gbit/s OTDM Signals," *ECOC '98*, Madrid, Spain, Sep. 20–24, 1998, p. 55 and 57.

Single Mode Fibre Fractional Wave Devices and Polarisation Controllers, Electronics Letters, Sep. 25, 1980, vol. 16. No. 20, pp. 778–780.

* cited by examiner

*Primary Examiner*—Hanh Phan
(74) *Attorney, Agent, or Firm*—Allen, Dyer, Doppelt, Milbrath & Gilchrist, P.A.

(57) ABSTRACT

A micro-optical delay element for a time-division multiplexing scheme is disclosed wherein two light beams are provided to a beam splitter/combiner (BS/C) in the absence of optical fibre. At least one beam exiting a modulator is collimated and reaches the (BS/C) unguided as a substantially collimated beam. This obviates a requirement for polarization controllers and polarization maintaining optical fiber

23 Claims, 13 Drawing Sheets

MICRO-OPTIC DELAY ELEMENT FOR USE IN A TIME DIVISION MULTIPLEXED SYSTEM

CROSS-REFERENCE TO RELATED APPLICATIONS

The present application is a continuation-in-part of co-pending U.S. patent application Ser. No. 09/342,154, filed Jun. 23, 1999 now U.S. Pat. No. 6,607,313, by Farries et al., entitled: "MICRO-OPTIC DELAY ELEMENT FOR USE IN A POLARIZATION MULTIPLEXED SYSTEM".

The present application claims priority from U.S. provisional application Ser. No. 60/378,777 filed May 8, 2002, by Munks et al.

FIELD OF THE INVENTION

This invention relates generally to optical fiber communications and in particular to multiplexed communications that uses time-division multiplexing.

BACKGROUND OF THE INVENTION

High-speed time-division-multiplexing (TDM) is a very attractive way of enhancing the spectrum efficiency of a large-capacity wavelength-division multiplexing (WDM) system. One common architecture employs two modulators having a same bit rate, wherein two separately modulated streams of data bits are combined into a high-speed single serial stream of data bits. Instead of providing a single higher-cost higher-speed modulator capable of providing modulation at a frequency of n Hz, two modulators having a frequency of n/2 Hz are provided and their outputs are time-interleaved providing a signal having a frequency of n Hz. However, one drawback to such a scheme, particularly in high-speed dense systems is that pulses from adjacent time slots spread and partially overlap one another and detection errors sometimes occur at a receiver end.

Such systems typically use lengths of optical fibre or other delay means to provide a required optical path length difference between two paths such that a predetermined delay between two data streams is provided to achieve bit interleaving.

One remedy for this is provided by an enhanced TDM system wherein adjacent interleaved pulses are distinguishable as they are orthogonally polarized. Such a scheme is described in a paper entitled 1.04-Tbit/s SWDM Transmission Experiment Based on Alternate-Polarization 80-Gbit/s OTDM Signals, by Yutaka Miyamoto et al., published in ECOC'98 Sep. 20–24, 1998 Madrid, Spain. In this paper alternate-polarization optical-TDM is described to increase the bit rate while keeping the signal spectrum from broadening. Here two modulated signals are time-division multiplexed with additional enhancement being achieved by polarization multiplexing of the two interleaved TDM streams.

Another system using enhanced polarization optical TDM is described and illustrated in U.S. Pat. No. 5,111,322 in the name of Bergano et al, entitled Polarization Multiplexing Device with Solitons and Method Using Same, incorporated herein by reference. In this patent, a transmission system's capacity is increased by using a combination of polarization and time-division multiplexing. More specifically, two streams of differently (preferably orthogonally) polarized solitons are interleaved (time-division-multiplexed) at a transmitter, and later separated at the receiver to recover both data streams.

Figure 2:
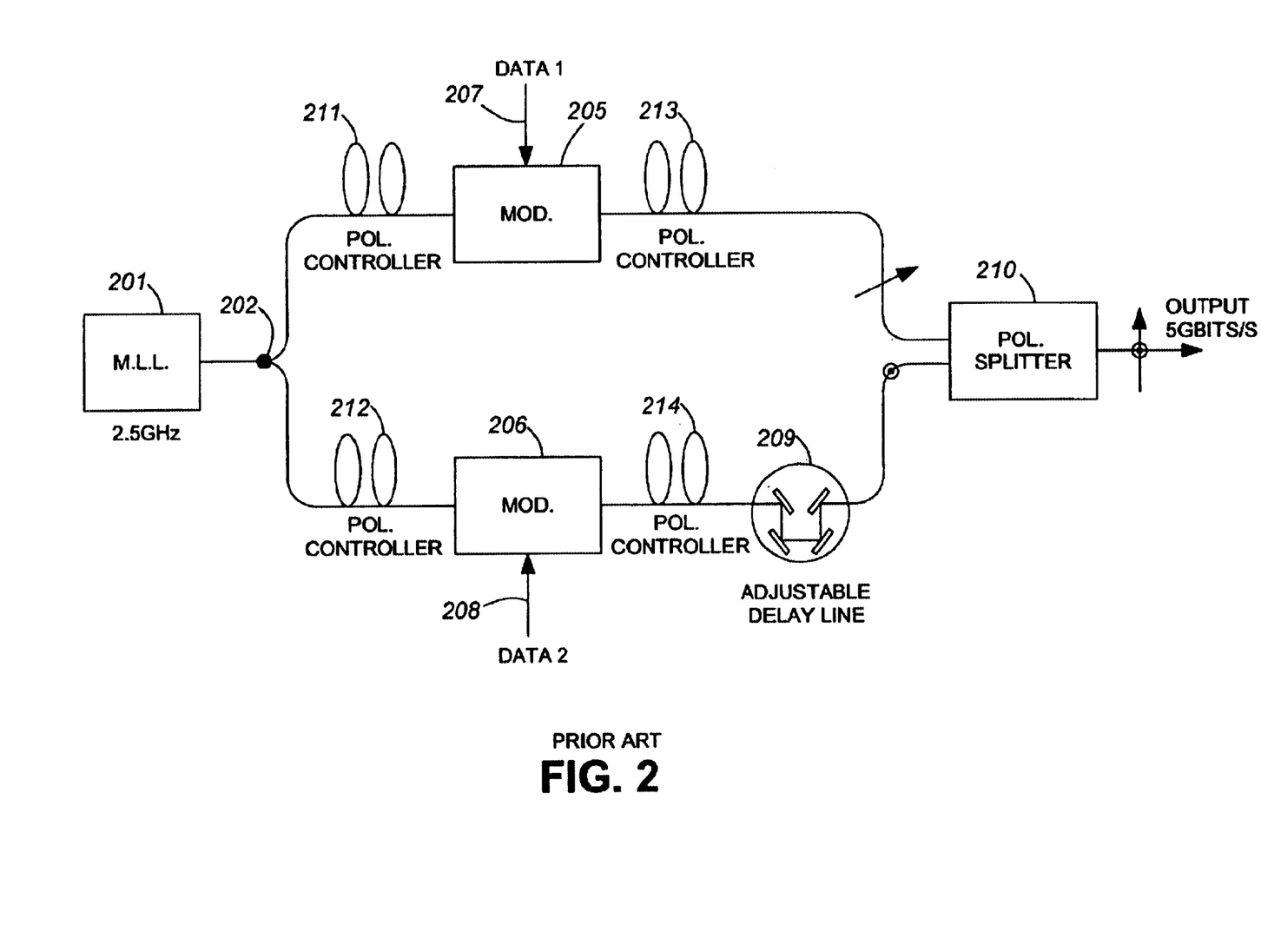
FIG. 2 illustrates a prior art schematic of a multiplexing circuit.

The multiplexing of 2 channels of 2.5 Gbits/s each, into a single 5 Gbits/s channel, and the corresponding demultiplexing at the receiving end, is described in conjunction with the multiplexor of FIG. 2 in prior art U.S. Pat. No. 5,111,322.

In FIG. 2 the signal source for the two channels is a single, mode-locked laser 201, producing about 35–50 ps wide soliton pulses at a 2.5 GHz rate. Its output is split into two soliton pulse streams having essentially orthogonal polarizations, in a splitter 202, and each half separately modulated (with different information bearing signals labeled Data 1 and Data 2) in modulators 205 and 206. Modulator 205 receives a first information bearing signal or data stream on line 207, while modulator 206 receives a second data stream on line 208. The two soliton pulse streams then recombine in a splitter 210, but only after one of the pulse streams is delayed by one-half of the 2.5 Gbit/s bit period in an adjustable delay line 209 so that the two pulse streams are interleaved in time.

A few practical details concerning the apparatus of FIG. 2 are in order here. The modulators 205, 206 should preferably be of the LiNbO.sub.3, balanced Mach-Zehnder type, as those produce virtually no chirping of the soliton pulses, and have an adequate on-off ratio (.about.20 dB). The required linear polarizations at the inputs to modulators 205, 206, and for the polarization multiplexing itself, can either be maintained through the use of (linear) polarization-preserving fiber throughout the multiplexor, or through the use of polarization controllers, such as controllers 211–214, both before and after modulators 205, 206 as shown in FIG. 2. Polarization controllers 211–214 may be arranged as described in an article by H. C. Levevre, "Single-Mode Fiber Fractional Wave Devices and Polarization Controllers", Electronics Letters, Vol. 16, p. 778, 1980. For the temporal interleaving of the two soliton pulse streams, it is necessary to make precise adjustment of the relative lengths of the two arms of the multiplexor. This can be done with adjustable delay line 209 which is shown interposed between the output of modulator 206 and polarization splitter 210. Nevertheless, delay line 209 is not absolutely necessary. It is also possible to trim the length of one or the other arm, through one or two trials, to within a few picoseconds of the correct length so the apparatus may remain all-waveguide throughout.

Figure 1:
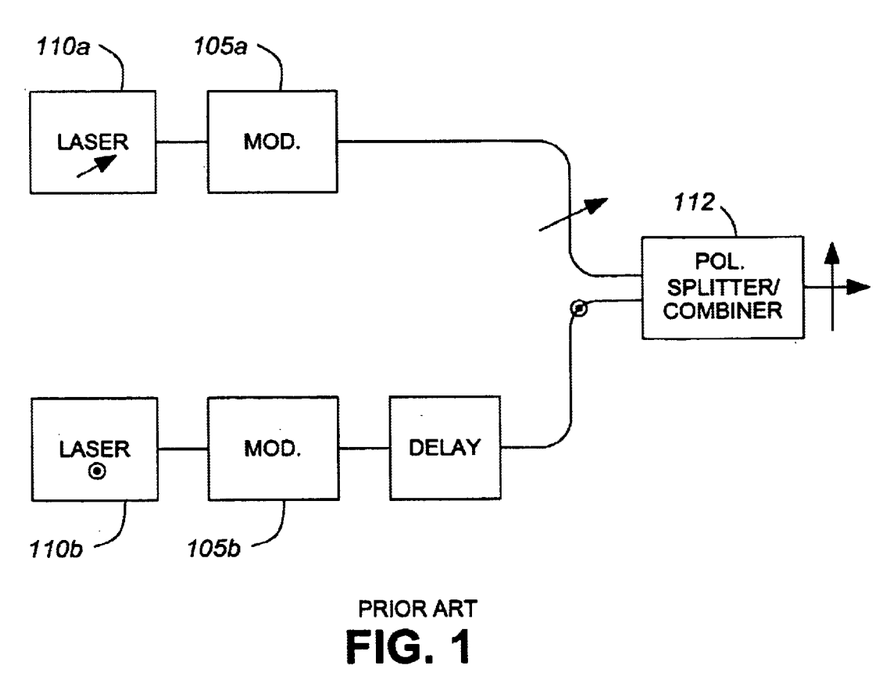
FIG. 1 is a prior art schematic diagram of a multiplexing circuit using 2 laser light sources oriented to yield orthogonal polarized light.
Figure 3:
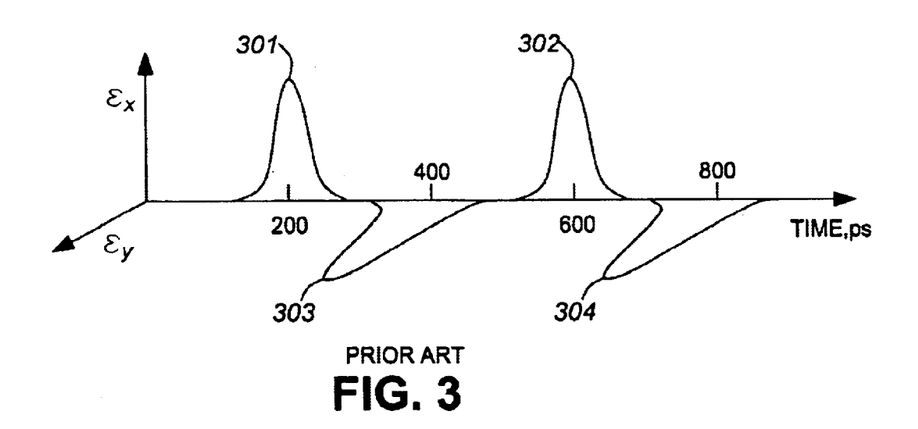
FIG. 3 illustrates the pulse field envelopes at the output of the multiplexor of FIG. 2.

The original soliton pulse stream output from the correctly adjusted multiplexer of FIG. 2 would appear as shown in FIG. 3. The x and y axes represent intensities of pulses of different (orthogonal) polarizations. As an example, soliton pulses 301 and 302 have an initial polarization along the axis and a period of 400 ps. Soliton pulses 303 and 304 have an orthogonal (y direction) polarization, the same period, and are time interleaved with the first series of pulses. Information is carried in the pulse streams by virtue of the presence or absence of pulses at the expected or nominal positions on the time axis. Note that launching the soliton pulses as in FIG. 3 not only achieves the potential for combined time and polarization division demultiplexing at the receiving end, but also virtually eliminates the potential for cross-phase modulation, and hence virtually eliminates the potential for interaction during transmission, between the two channels. An alternative circuit to FIG. 2 is shown in FIG. 1, wherein two laser sources are shown, oriented to provide two orthogonally polarized beams; in all other respects, the circuit of FIG. 1 functions in a similar manner to the circuit of FIG. 2, however is absent the polarization controllers 211 and 212.

The aforementioned prior art reference by Miyamoto et al. teaches the use of delay lines to time-skew the pulse trains that are to be multiplexed. For example, the paper discloses using two different lengths of polarization maintaining fibre in order to create a suitable delay. Although using different lengths of optical fibre provides a necessary delay, ensuring that this delicately balanced network is stable over a range of temperatures is not trivial.

Although the prior art optical circuits to some degree provide solutions for polarization time-division multiplexing, the '322 patent for example describes a rather complex optical circuit where polarization controllers are shown to control the polarization state of the light propagating through the optical fibres.

In contrast, the circuit in accordance with this invention is a micro-optic circuit that does not rely on the use of polarization controllers and does not require polarization-maintaining optical fibre.

Furthermore, an aspect of the instant invention provides a micro-optic delay element, which utilizes the polarization difference between two data-streams to be time-multiplexed while preserving the polarization state of the two orthogonal streams. Furthermore, the instant invention provides a solution, which is considerably, more temperature-stable than using two separate waveguides and independently controlling for any temperature difference between the two waveguides.

In another aspect of the invention a bulk delay optical circuit is provided wherein to optical paths are provided wherein light propagating along the two paths is unguided. The unguided beams comprising separate bit streams are then combined to provide a single time-multiplexed data stream. This embodiment obviates the use of optical fiber as part of the delay element and provides for a more smaller, more stable, more controllable circuit.

This invention obviates the prior art circuits where blocks performing functions such as rotating polarizations, monitoring, providing delay, were connected together using polarization maintaining fiber. Using these prior art methods of assembly increased cost, lessened precision, where devices were very sensitive to external perturbation such as vibration and handling and to temperature changes. In these prior art embodiments, the length of each polarization maintaining fiber had to be controlled to a very high level of precision. Differentical delay was accomplished by careful control of fiber lengths. In addition there was a section that was adjustable for fining tuning.

SUMMARY OF THE INVENTION

In accordance with the invention a circuit is provided for receiving two streams of data and for polarization time-division multiplexing the two streams of data onto a single waveguide such that one of the data streams is delayed by a time $t_d$ from the other data stream, comprising:

a first modulator having an input port and an output port for modulating input light and for providing a first modulated data stream;

a second modulator having an input port and an output port for modulating input light and for providing a second modulated data stream;

a first lens for collimating light provided by the first modulator;

a second lens for collimating light provided by second modulator, the first and second lenses each for providing a substantially collimated substantially unguided beam of light to at least another component;

a polarization beam splitter/combiner having two input ports at one end optically coupled to receive the substantially collimated, substantially unguided beams of light, said polarization beam splitter/combiner having a combining port at another end for combining the data streams such that one data stream delayed by a time $t_d$ from the other data stream, light traversing parallel paths from the first and second lenses respectively to the polarization beam splitter combiner being substantially unguided, so that light traversing at least one of said parallel paths will have a polarization state which is substantially unchanged.

In accordance with the invention, there is provided a circuit for receiving two streams of modulated data and for polarization and time-division multiplexing the two streams onto a single waveguide, comprising:

a polarization rotator for rotating the polarization of one of the two modulated data streams; and, a birefringent crystal having at least two input ports disposed at one end to receive the two modulated data streams having orthogonal polarization states, the birefringent crystal having an output port disposed at an opposite end to receive and combine the two modulated data streams into a single time-interleaved data stream, the birefringent crystal being of suitable length for providing a path length difference between each of the at least two input ports and the output port to provide a required time delay at the output port between the two data streams.

In accordance with another aspect of the invention, a method of multiplexing optical signals onto an output port is provided. The method comprises the steps of:

providing two modulated polarized optical signals having a polarization difference between the two modulated signals of substantially 90 degrees;

passing one of the two modulated signals along a first path in a birefringent crystal;

passing another of the two modulated signals along a second path intersecting the first path at the output port of the birefringent crystal.

In accordance with the invention there is provided a fibreless optical circuit for receiving two streams of modulated data and for polarization multiplexing the two data streams onto a single waveguide, comprising:

a modulator module for independently, and in parallel, modulating optical signals and for providing two data streams;

a birefringent crystal having at least two input ports at an end thereof disposed to receive the two modulated data streams having different polarization states, the birefringent crystal having an output port disposed at an opposite end thereof to receive and combine the two modulated data streams into a single multiplexed data stream, the birefringent crystal being of suitable dimensions to provide time division polarization multiplexing, the circuit being fibreless such that there is an absence of optical fibre between the modulator module and the birefringent crystal for coupling light therebetween.

In a broad aspect of the invention, a circuit is provided for receiving two streams of data and for and time-division multiplexing and interleaving the two streams onto a single waveguide. The circuit comprises: modulation means for providing first and second modulated data streams in the form of a first beam and a second beam; and, means optically coupled with the modulation means for routing and combining the first and second beams in an unguided manner, such that beams of light launched into said means are unguided as they propagate therethrough in the absence of waveguides, said means for routing and combining having at least two input ports optically coupled to receive the first and second beams and having an output port to on which to combine the two beams into a single time-interleaved data stream, the means for routing and combining for providing an optical path length difference along two paths between each of the at least two input ports and the output port for light launched into the at least two input ports on route to the output port to provide a required time delay at the output port between the two data streams such that the data within the data streams is time interleaved having a bit period Dt.

In accordance with the invention a circuit is provided for receiving two orthogonally polarized streams of data and for polarization and time-division multiplexing the two streams onto a single waveguide. The circuit in accordance with this aspect of the invention includes polarization dependent means having:

first and second input ports at an end thereof;

an output port optically coupled with the first and second ports;

a first unguided optical path and a second unguided optical path disposed between the first and second input ports respectively and the output port, for receiving the two orthogonally polarized data streams and for carrying said data streams to said output port in an unguided manner, the first and second unguided paths being of a different optical path length which differ by an optical path length DnL, wherein the length dnL, is selected to provide a required relative time delay between the two data streams as they pass along the first and second unguided paths from the first and second input ports to the output port such that the data streams become a single time-interleaved data stream having a predetermined bit period Dt.

Conveniently, if a delay is required that exceeds the delay that is provided by traversing the first and second paths of the birefringent crystal having different optical lengths, a spacer can be inserted into each of the signal paths prior to the signals reaching the birefringent crystal, wherein the spacers are of a substantially different refractive index. This method is quite suitable when optically coupling a lithium niobate modulating block with a rutile crystal, wherein no optical fibres are used except perhaps coupled to output ports.

In summary, the devices in accordance with this invention are small and compact and integrated. Yet still further, due to their compactness are somewhat easier to temperature control than, for example the prior art circuits shown. Yet still further, and perhaps more importantly, the optical circuit including the modulator focusing optics between the modulator and a polarization beam splitter/combiner do not require any optical fibre for coupling of light therebetween. Advantageously, by an providing a relatively unguided light path, polarization controllers or polarization maintaining fibre is not required. As well by providing block like elements coupled to one another, i.e. one or more modulator blocks coupled to rod GRIN lenses, coupled to a birefringent crystal yields a compact easy to assemble device that can be conveniently packaged.

BRIEF DESCRIPTION OF THE DRAWINGS

Exemplary embodiments of the invention will now be described in conjunction with the drawings in which.

DETAILED DESCRIPTION

Figure 4:
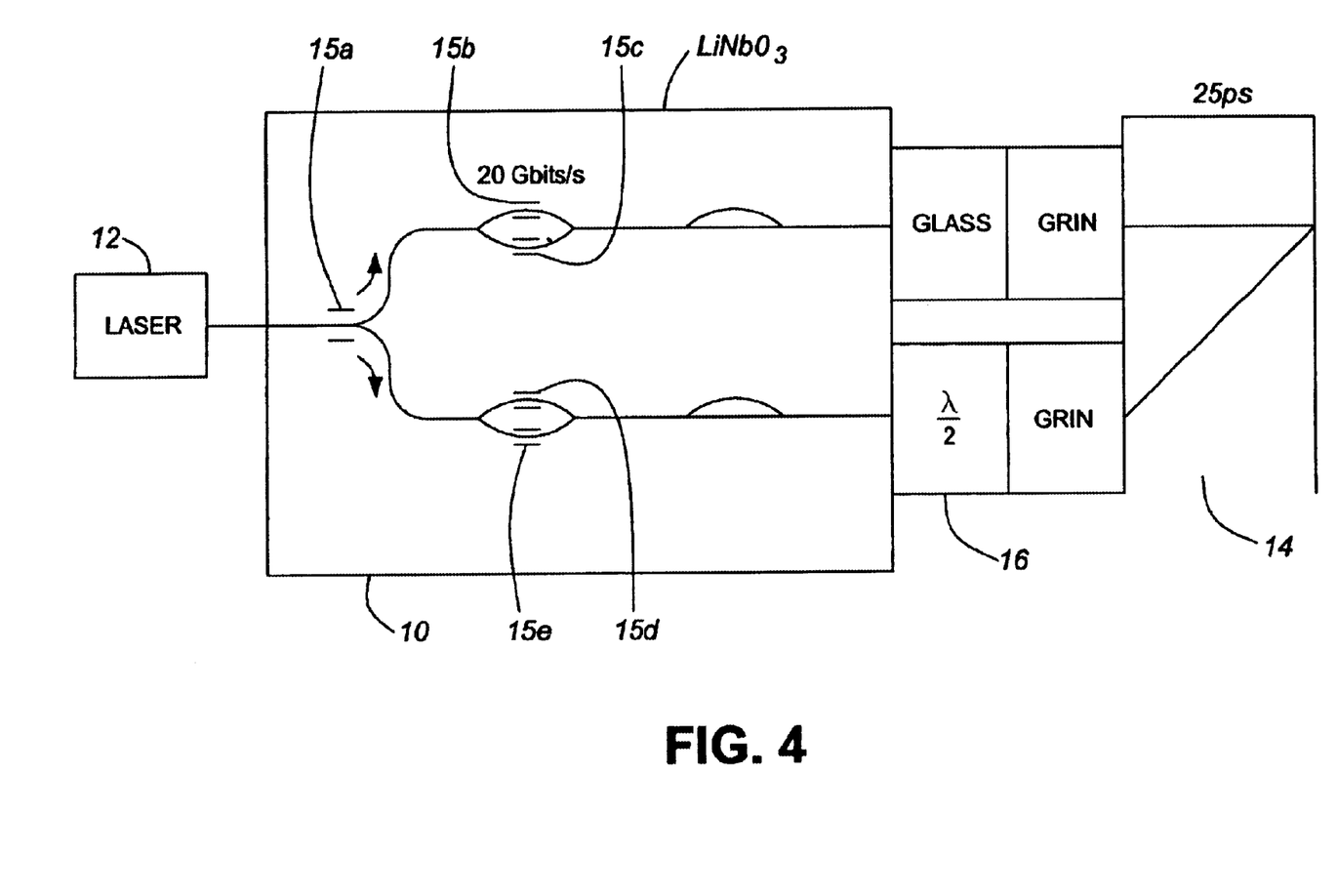
FIG. 4 illustrates a schematic circuit block diagram of an enhanced TDM multiplexor in accordance with this invention.

Turning now to FIG. 4, a substantially integrated microoptic circuit is shown having a slab waveguide chip 10 having an end optically coupled with a laser 12 and having an end optically coupled with a birefringent crystal 14. At an input end of the crystal 14, a half waveplate 16 is provided for rotating the polarization of the light passing therethrough by 90°.

The slab waveguide chip is $LiNbO_3$ having waveguide disposed therein. The waveguides can be formed by ion implantation or alternatively by grafting polymer or other such light transmissive material into the chip. Electrical contacts are disposed about the waveguides 15a, 15b, 15c . . . and in operation a voltage is be applied to modulate the signal passing between the contacts. Variable attenuators are provided at the output for controlling the amplitude of the modulated signals. Although $LiNbO_3$ is a preferred modulator, of course other types of modulators may be used, for example electro-absorption or GaAs. Aside from the compactness and temperature stability of the circuitry shown within the waveguide 10, the operation and interconnection of the components is substantially similar to the circuitry shown in FIG. 2. Notwithstanding, one major difference between the circuit of the instant invention, shown in FIG.

4 and the prior art circuits, is the provision of the birefringent crystal for use as a polarization combiner and delay line for time-division polarization interleaving of pulses. One even more significant difference in this circuit and prior art circuits for time-division polarization multiplexing is the fibreless nature of the circuit from the modulator module 10 to the beam splitter/combiner, for example shown here in the form of a crystal 14. By coupling substantially collimating lenses, for example, quarter pitch GRIN lenses to the modulator 10, collimated beams are provided to next elements in sequence and to the crystal 14. Since the substantially collimated beam traverses the glass spacer and quarter waveplate substantially unguided, its polarization state is substantially unaltered.

Figure 5:
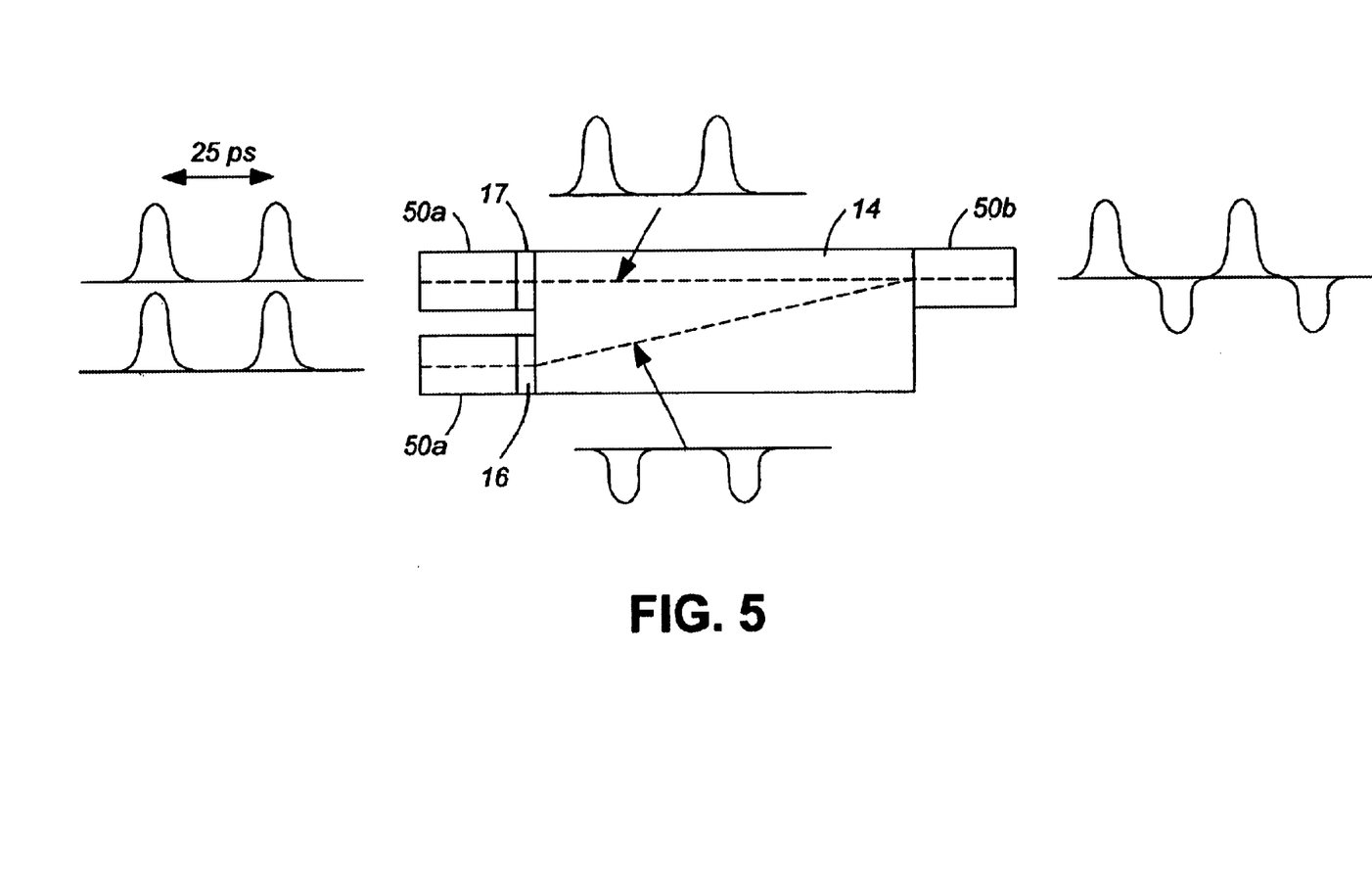
FIG. 5 is a schematic block diagram which illustrates a portion of the circuit used for multiplexing and which illustrates the operation of that circuit portion.
Figure 6:
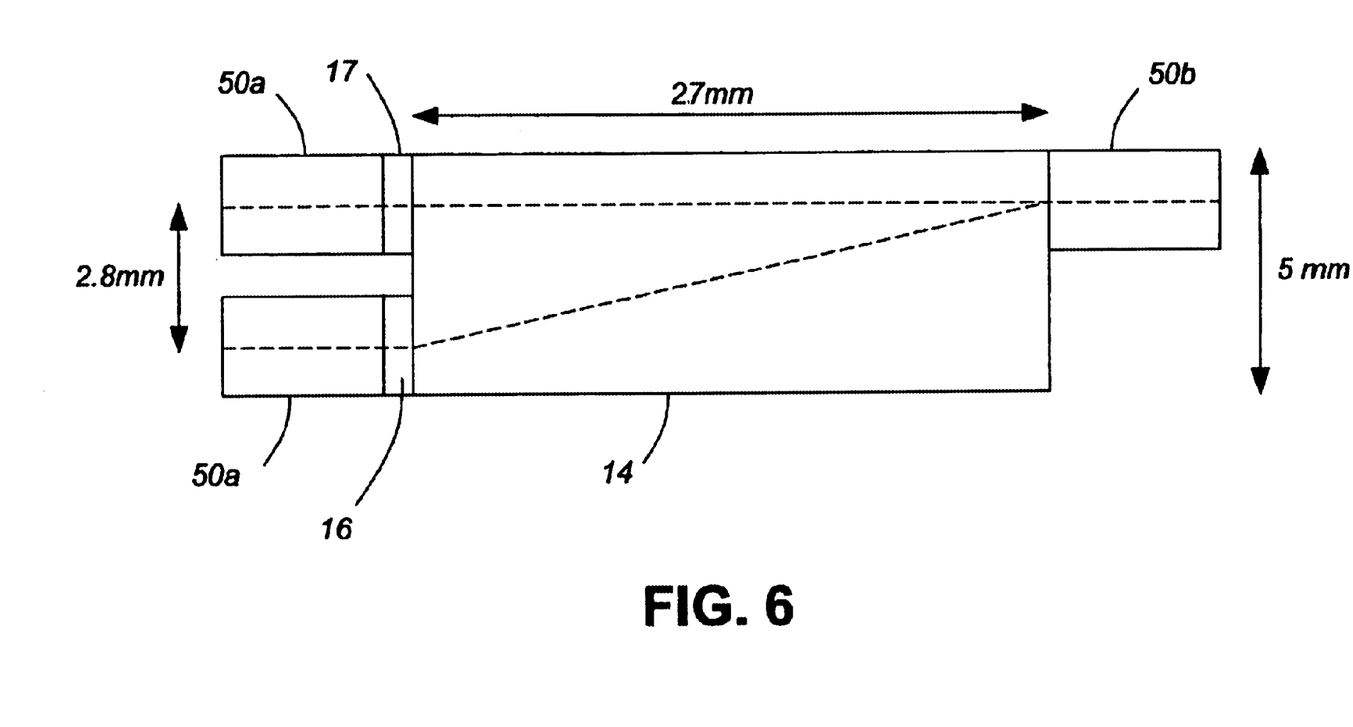
FIG. 6 is a more detailed embodiment illustrating the circuit of FIG. 5.
Figure 7:
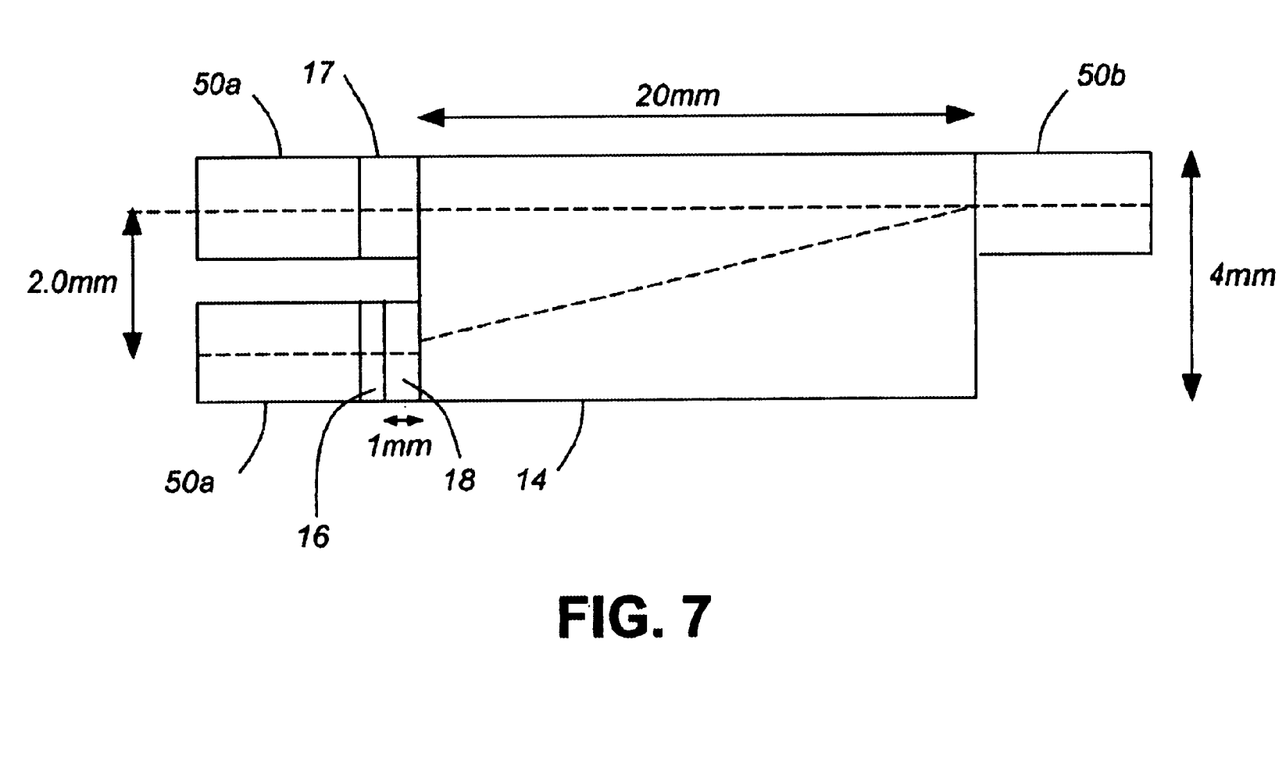
FIG. 7 is an alternative embodiment to the circuit of FIG. 6, wherein two spacers having different refractive indices are utilized to achieve a time delay between signals traversing the two spacers.
Figure 8:
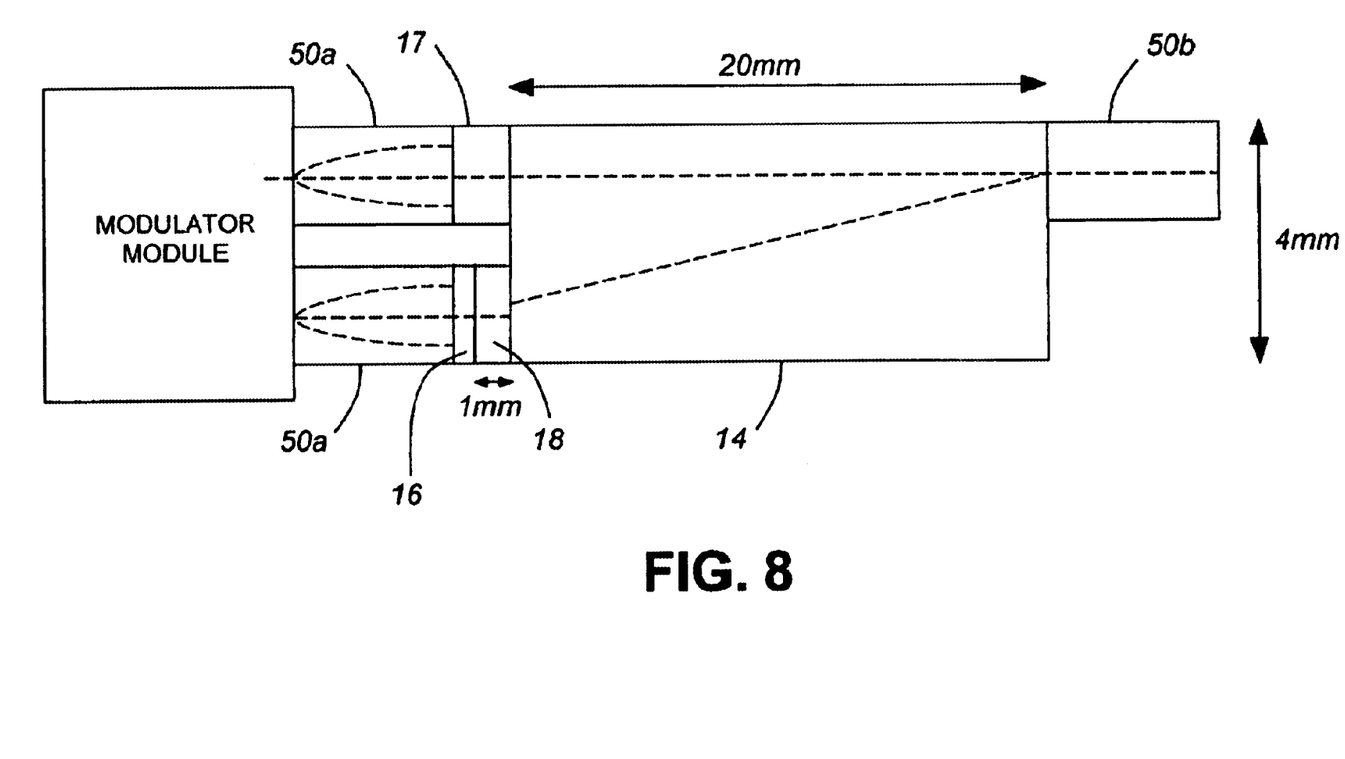
FIG. 8 is a schematic block diagram of a preferred embodiment of the invention showing the modulator module coupled to a rutile crystal via a pair of substantially quarter pitch collimating GRIN lenses.

FIG. 5 illustrates a portion of the circuit shown in FIG. 4 depicting the operation of the polarization combining and multiplexing circuit. This circuit conveniently provides the added advantage of achieving a predetermined required delay. A stream of pulses spaced by 25 ps are provided at the input end of each of the GRIN lenses 50a. Light directed through the bottom GRIN lens is rotated by 90 degrees by the waveplate 16. As can be seen in figure, this beam must travel a greater distance to reach GRIN lens 50b, than the beam that follows a straight through path launched into the upper GRIN lens 50a. This in effect skews the pulses in time that were launched simultaneously into the two GRIN lenses such that the orthogonally polarized pulses become combined and time multiplexed, as shown at the output of the GRIN lens 50b. FIG. 6 (not drawn to scale) illustrates in more detail, dimensions of a birefringent or rutile crystal that achieves a desired time delay to provide time multiplexing of these two orthogonally polarized streams of pulses. The length of the crystal in this exemplary embodiment is 27 mm, and the with is 5 mm. Of course to some extent, the size of a crystal that is required is proportional to it cost. FIG. 7 illustrates yet another embodiment, wherein a spacer of glass 17 is inserted into the upper optical path, and a spacer of silicone 18 provides a portion of the lower optical path. By selecting light transmissive materials such as glass and silicone that have a substantially different refractive indexes in the two paths the beams must follow, delays in addition to delay provided by the birefringent crystal 14 can be enhanced and further controlled between the two. For example, in FIG. 7, the silicone spacer 18 shown, has a much higher refractive index than the glass spacer 17; light traveling through the silicone propagates therethrough slower than light traveling through a similar length of glass. Notwithstanding, a birefringent crystal of at least some minimum proportions is required. In the example shown, the beams propagating through the birefringent crystal 14 are collimated or near-collimated and substantially separated at the input end of the rutile. Thus, the crystal must be of dimensions that will support two beams, combine them, and provide a suitable required delay even in the instance that additional delay is provided by the silicone spacer. However, it can be seen, by comparing FIGS. 6 and 7, that the overall dimensions of the rutile, required to combine and time multplex the two pulse streams is substantially lessened in the embodiment of FIG. 7. Nevertheless, this embodiment requires suitable antireflection coating between the GRIN lens 50a and the silicone spacer.

Figure 9:
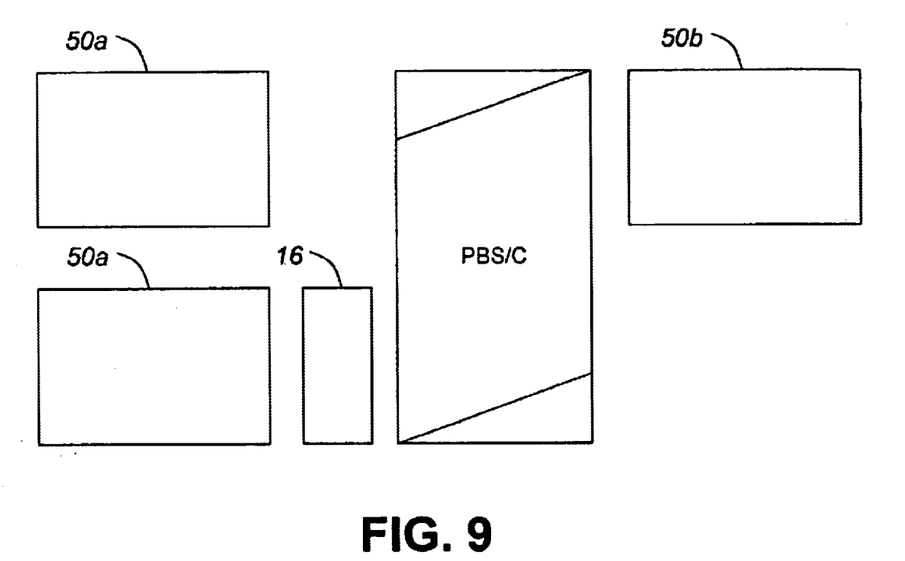
FIG. 9 is a schematic block diagram illustrating a polarization beam splitter/combiner in the form of a polarization beam splitting cube.

It should be noted that in an alternative example, the polarization beam splitter/combiner described heretofore, is a rutile crystal, however, a polarization beam splitting cube could be used instead of the rutile as is shown in FIG. 9.

Figure 10:
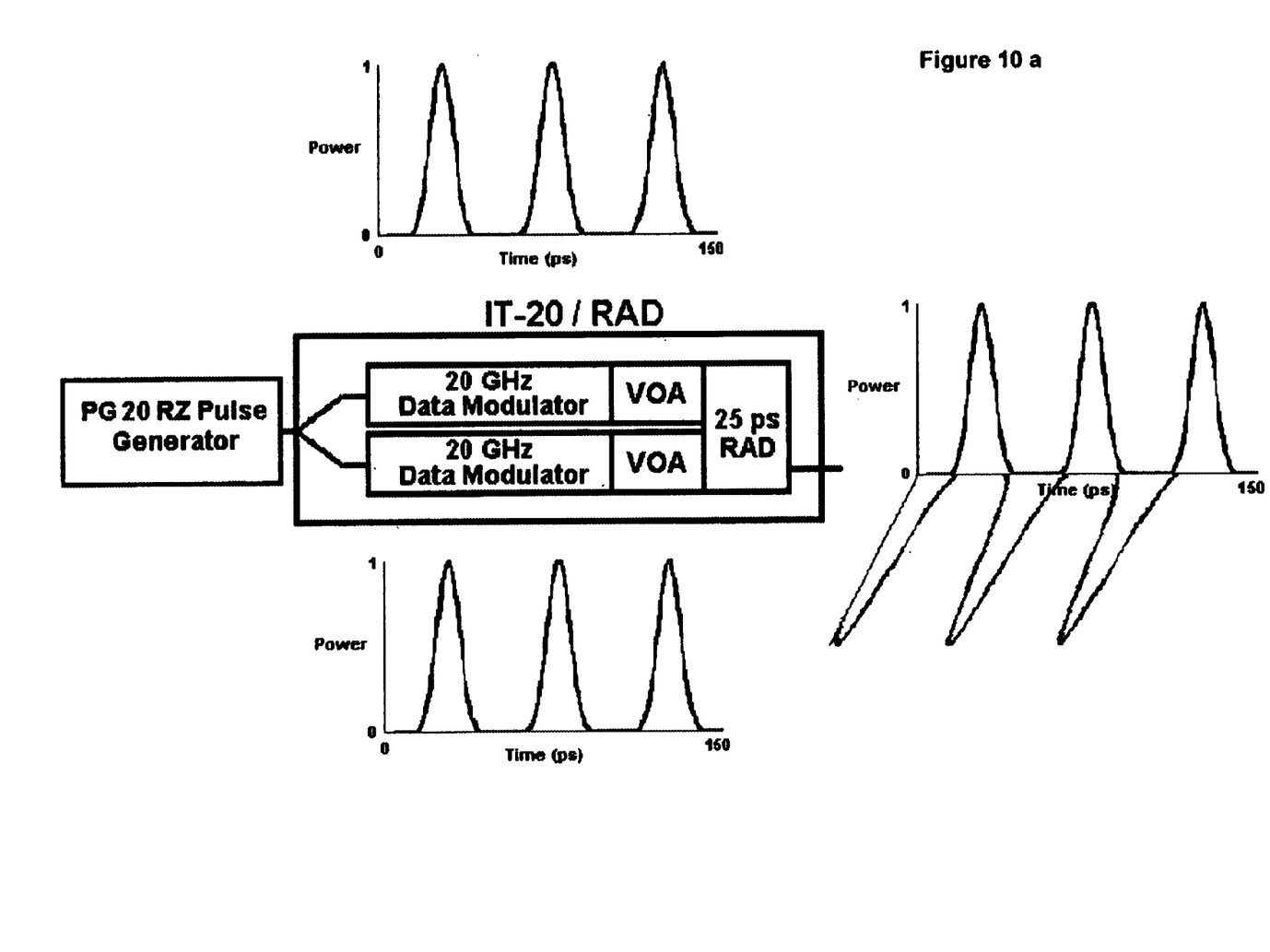
FIGS. 10a and 10b are block diagrams of a polarization bit interleaver in accordance with a preferred embodiment of the invention.
Figure 10B:
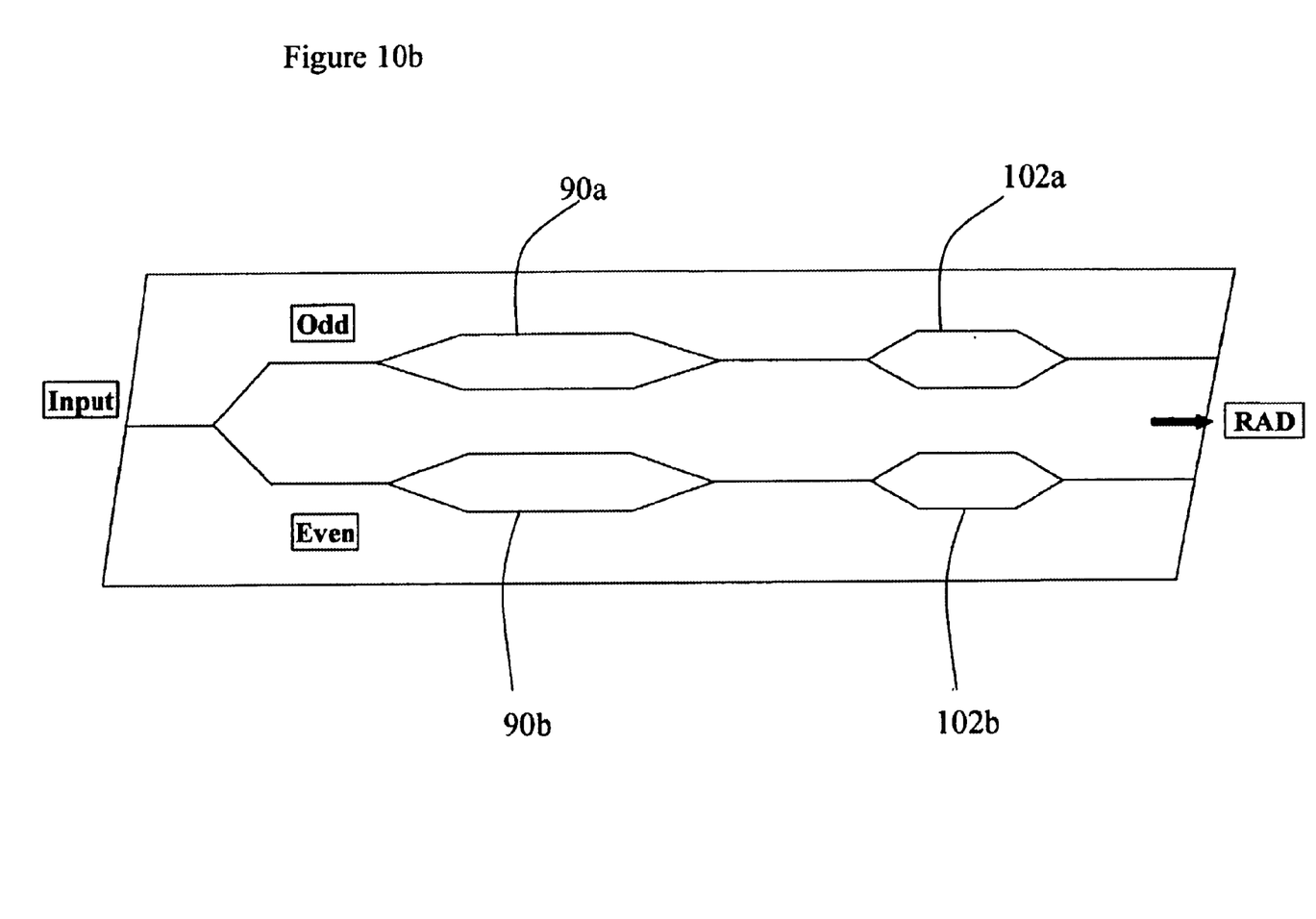

FIGS. 10a and 10b illustrate an optical circuit is shown wherein two modulators 90a and 90b fabricated on a single substrate provide modulated signals to voltage controlled attenuators (VOAs) 102a and 102b. Modulator 90a is an odd channel modulator and 90b is an even channel modulator. The voltage controlled attenuators 102a and 102b are controlled by a feedback signals received from a photodetector array 103. A rotate and delay (RAD) circuit 104 is directly coupled to the output of the VOAs which combines the two modulated signals into a time interleaved single bit-stream signal.

Figure 11:
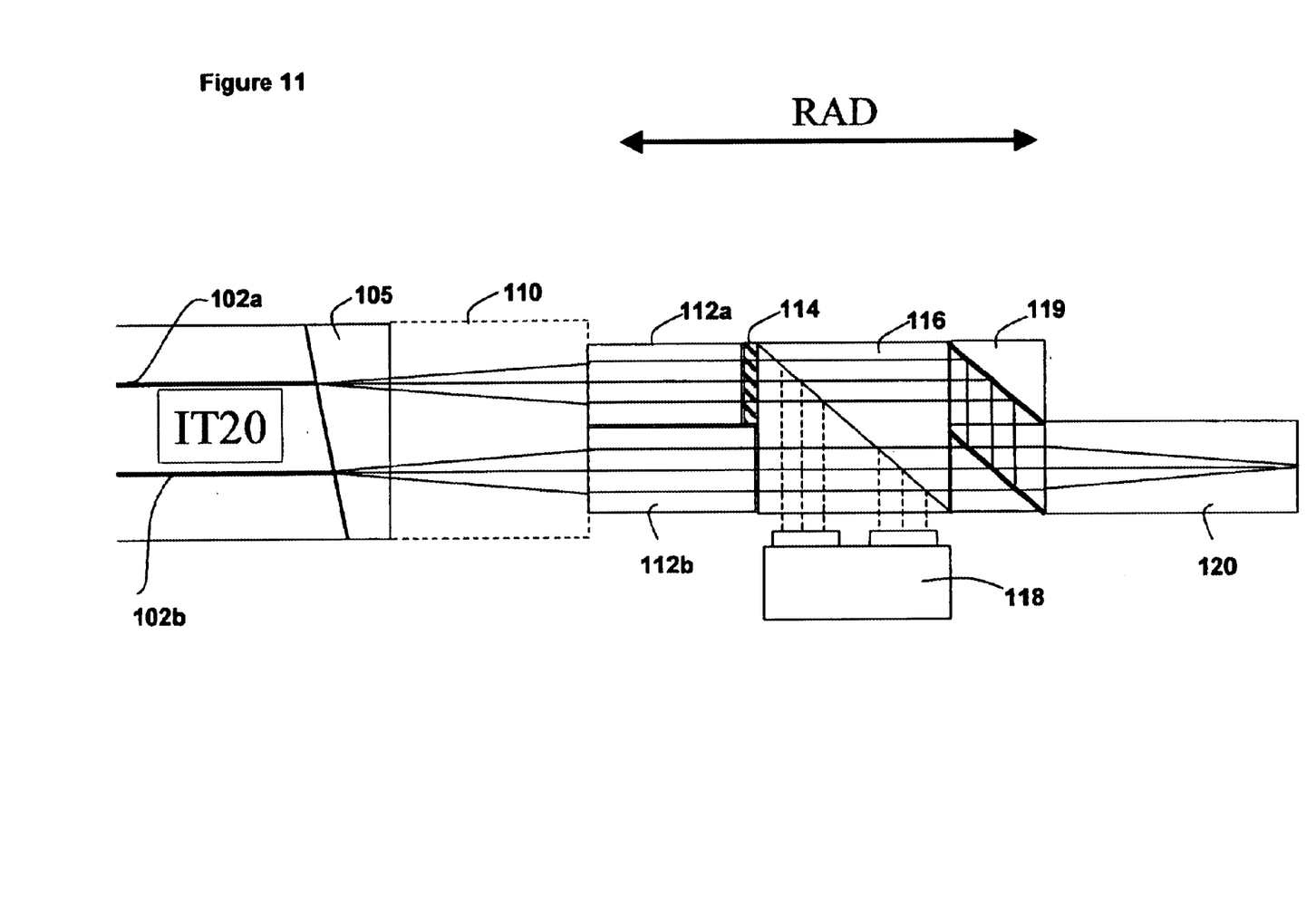
FIG. 11 is a schematic block diagram of an alternative embodiment of the invention that uses a conventional polarization beam splitter (PBS)/combiner instead of birefringent crystal for combining the two data streams into a single interleaved data stream.

Turning now to FIG. 11, an embodiment of the RAD circuit is shown directly coupled to a lens array 110 for providing two substantially collimated beams to the downstream optical elements. A prism 105 is disposed between the array 110 and the VOA block. The prism contains apertures that produce the spatial filtering of the light out of the lithium niobate modulators 90a and 90b. 2. This means of spatial filtering the outputs between the guided section and the unguided section improves the signal to noise ratio (SNR) of the power monitoring devices The lithium niobate block is polished at an angle to prevent back reflections.

The lens array 110 is optically and directly coupled to a silicon spacer 112a and a BaK1 spacer 112b providing two unguided paths for the two modulated bit streams. The two different materials selected for these paths provide a relative different optical path length between the paths due to their different refractive indices. In other embodiments not shown, additional path routing through elements in an unguided manner can be utilized to achieve this end without using materials having different refractive indices. A half waveplate 114 is shown adjacent to the spacer 112a for rotating/retarding the polarization of the bitstream received from a modulator (not shown). A tap beam splitter 116 is optically coupled to the $\pi/2$ wave plate 114 and to an end face of the spacer 112b for providing a portion of the two bit streams to a photodiode array 118 and for passing through the remaining portion of the two bit streams to a PBS/combiner 119. The electrical signals from this photodiode array monitor proportional to optical signals detected by the photodiode array 118 are used to control integrated VOAs 102a and 102b shown in FIG. 10. The polarization beam splitter/combiner 119 receives the two collimated beams from the spacers and rotator and combine the two beams in a polarization dependent manner into a single time interleaved bit stream. Output imaging lens, in the form of a graded-index (GRIN) lens 120 receives and focuses the collimated beam for coupling to a fiber or waveguide.

Figure 12:
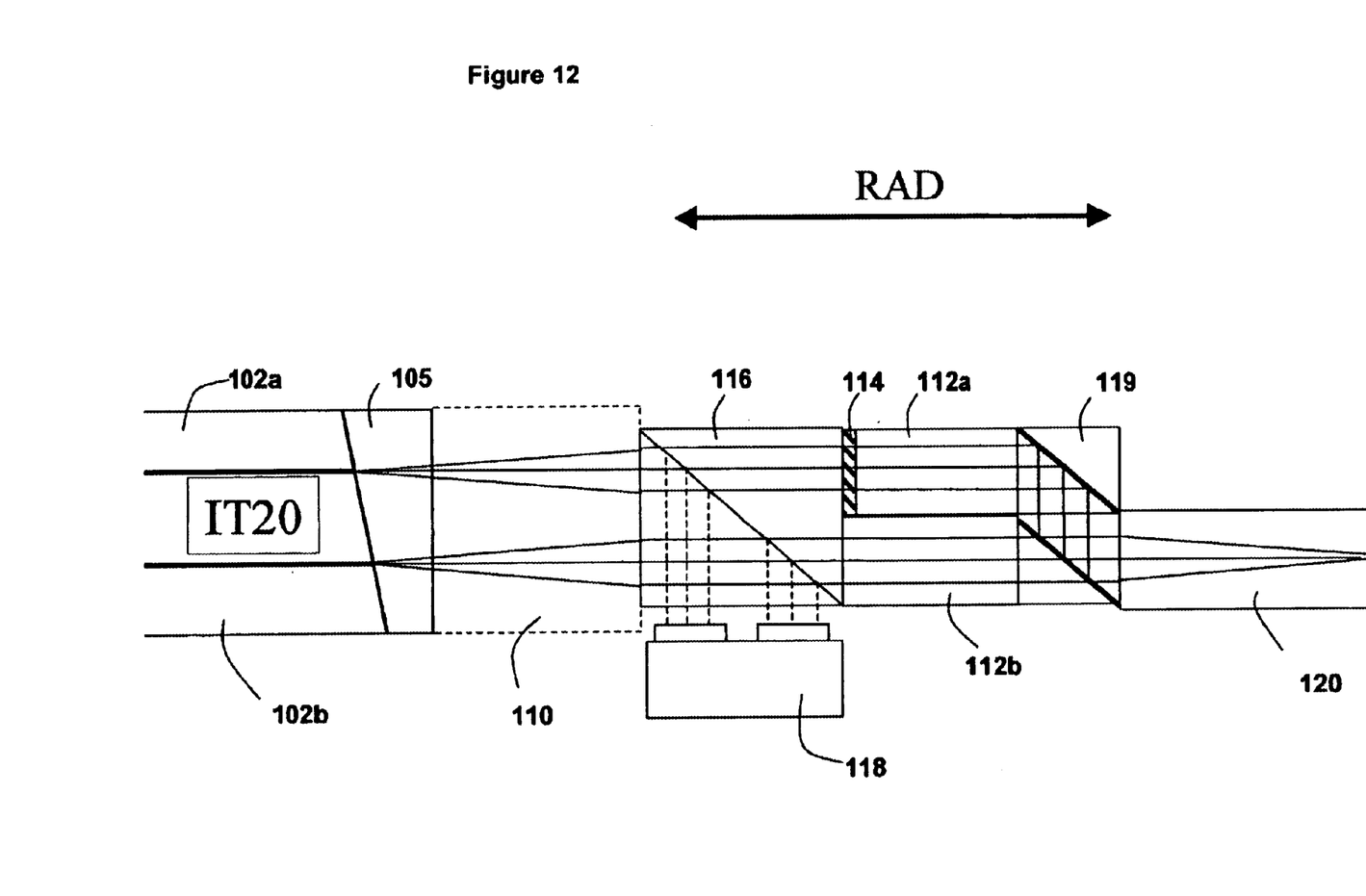
FIG. 12 is a schematic block diagram similar to that shown in FIG. 10, however shown with the half waveplate and tap PBS shown in a different and preferred order such that the individual channels are orthogonal in polarization when they are monitored; and, FIG. 13 is a schematic block diagram of an alternatve embodiment of the invention which is polarization indepenent, and wherein the PBS of the previous two embodiments is replaced with a beam splitter (BS).

Referring now to FIG. 12 a similar circuit is shown, however the tap beam splitter 116 is shown sandwiched between an imaging system in the form of lens array 110 and the $\pi/2$ wave plate 114 and spacer 112b. The embodiment of FIG. 11 is preferred to that of FIG. 12 as it rotates the polarization prior to the tap beamsplitter photodiode array VOA control. This minimizes coherent effects at the photodiode array 118. In both embodiments the use of a lens array is preferred as it significantly simplifies the assembly process.

In embodiments described heretofore, a half-wave plate is shown for rotating the polarization along one path, however, it is conceivable to provide orthogonally polarized beams of light to the modulator, obviating the requirement of a rotator.

Figure 13:
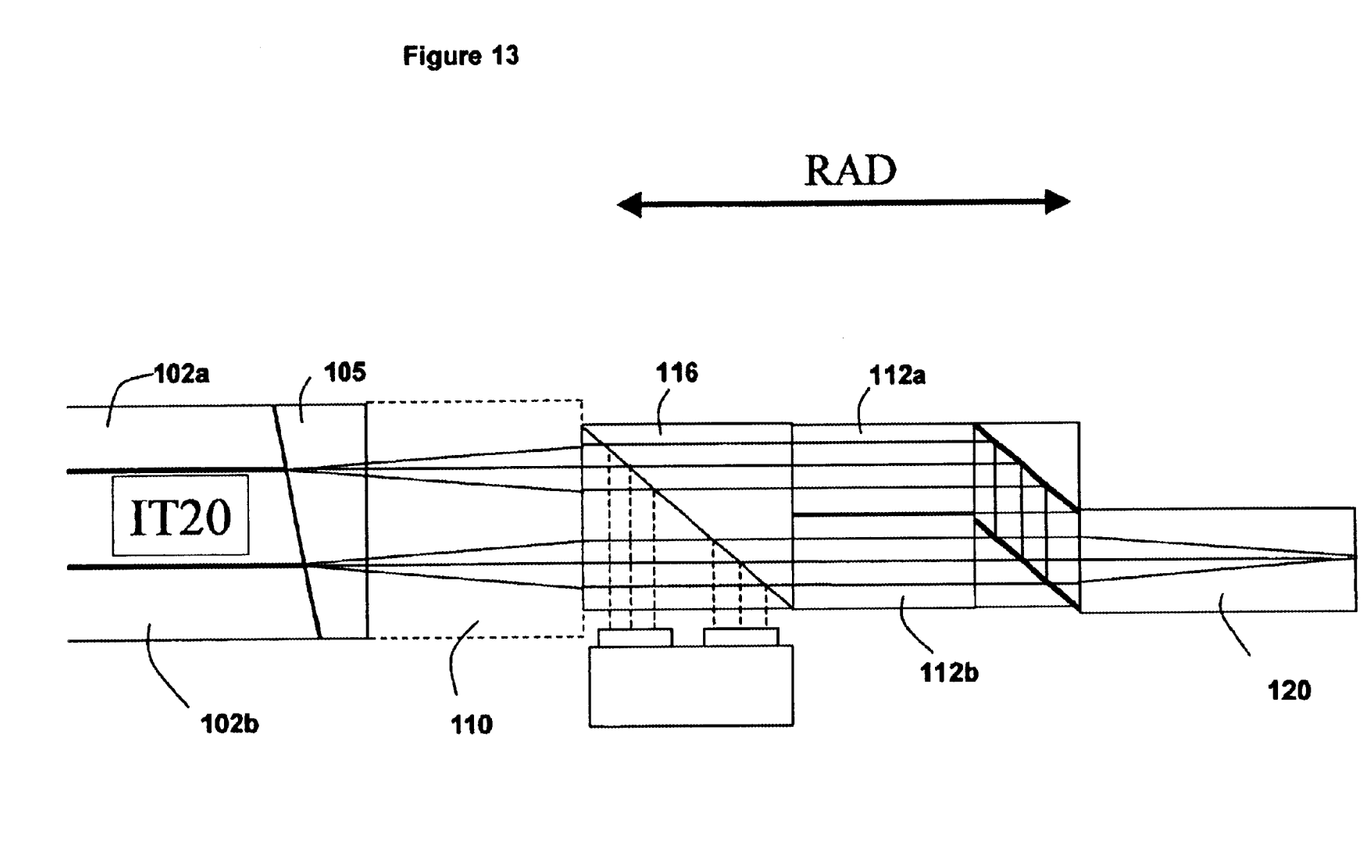

Another embodiment of the invention is shown in FIG. 13 similar in some respects to those of FIGS. 11 and 12, however this embodiment functions in a polarization independent manner. In this embodiment the PBS is replaced by a 3 dB beam splitter/combiner and the need for a halve-wave plate is obviated. By using the non-polarizing beam splitter there is a 3 dB loss for each channel.

In these three latter embodiments there is a common feature which provides significant advantages related to cost, ease of assembly and performance. An optical path length difference between two separate data paths is provided by using bulk components having a material difference in refractive index or and/or a physical path length difference and wherein the beams carrying the separate data traverse the system comprising the spacers and beam splitters in an unguided fashion.

Advantageously, the dual modulators 90*a* and 90*b* are shown in FIG. 10 fabricated on a single lithium noibate substrate; and, each modulator is followed by a VOA 102*a*, 102*b* on the same substrate. By using the input imaging system, or lens array 110, there is no need to align each lens independently. The same advantage is gained by using a photodiode array such that both photodiodes are aligned simultaneously.

What we claim is:

1. A circuit for receiving two streams of data and for polarization time-division multiplexing the two streams of data onto a single waveguide such that one of the data streams is delayed by a time $T_d$ from the other data stream, comprising:

a first modulator having an input port and an output port for modulating input light and for providing a first modulated data stream;

a second modulator having an input port and an output port for modulating input light and for providing a second modulated data stream;

a first lens for collimating light provided by the first modulator;

a second lens for collimating light provided by second modulator, the first and second lenses each for providing a substantially collimated substantially unguided beam of light to at least another component;

a polarization beam splitter/combiner having two input ports at one end optically coupled to receive the substantially collimated, substantially unguided beams of light, said polarization beam splitter/combiner having a combining port at another end for combining the data streams, wherein optical path from one input port of the splitter/combiner to the combining port is different than optical path from the other input port of the splitter/combiner to the combining port such that one data stream is delayed by a time $T_d$ from the other data stream, whereby the block has both a light combining function and a time delay function, light traversing parallel paths from the first and second lenses respectively to the polarization beam splitter/combiner being substantially unguided, so that light traversing at least one of said parallel paths will have a polarization state which is substantially unchanged.

2. A circuit as defined in claim 1 further comprising means for rotating the polarization of one of the two modulated data streams optically coupled with one of the first and second modulators.

3. An optical circuit as defined in claim 2, wherein the first and second modulators, the means for rotating polarization, and the polarization beam splitter/combiner are all optically coupled without optical fibres therebetween, and wherein the first and second lenses are GRIN lenses.

4. An optical circuit as defined in claim 3, wherein the polarization beam splitter/combiner is a birefringent crystal being of suitable length for providing a path length difference between each of the at least two input ports and the output port to provide a time delay of $T_d$ at the output port between the two data streams.

5. An optical circuit as defined in claim 3, wherein the polarization beam splitter/combiner comprises polarization beam splitting cubes being of suitable dimensions for providing a path length difference between each of the at least two input ports and the output port to provide a time delay of $T_d$ at the output port between the two data streams.

6. An optical circuit as defined in claim 3, wherein the polarization beam splitter/combiner is a birefringent crystal being of suitable length for providing a path length difference between each of the at least two input ports and the output port to provide a time delay of $T_d$ at the output port between the two data streams in combination with a delay element disposed in the optical path between one of the modulators and a longest path from one of the input ports of the birefringent crystal to its output port.

7. A circuit as defined in claim 1 wherein a geometrical distance from each modulator output port to respective optically coupled input ports of the polarization beam splitter/combiner is substantially the same, and wherein the optical path lengths from the first and second modulator output ports to the combining port of the polarization beam splitter/combiner are different to effect the time delay $t_d$.

8. The circuit as defined in claim 1, further comprising a spacer element disposed in one of the parallel paths with a means for rotating polarization disposed in the other path, the spacer element for equalizing a geometric distance between parallel paths from the output ports of the modulators to the input ports of the polarization beam splitter/combiner.

9. The circuit as defined in claim 1, wherein the lenses are GRIN lenses, the circuit further comprising a spacer element in at least one of the parallel paths having a refractive index substantially higher than an average refractive index of either of the GRIN lenses for substantially delaying a beam of light propagating therethrough.

10. The circuit as defined in claim 9, wherein the spacer element is made of silicon.

11. A fibreless optical circuit for receiving two streams of modulated data and for polarization multiplexing the two data streams onto a single waveguide, comprising:

a modulator module for independently, and in parallel, modulating optical signals and for providing two data streams;

a birefringent crystal having at least two input ports at an end thereof disposed to receive the two modulated data streams having different polarization states, the birefringent crystal having an output port disposed at an opposite end thereof to receive and combine the two modulated data streams into a single multiplexed data stream, the birefringent crystal being of suitable dimensions to provide time division polarization multiplexing, the circuit being fibreless such that there is an absence of optical fibre between the modulator module and the birefringent crystal for coupling light therebetween.

12. A circuit for receiving two streams of modulated data and for polarization and time-division multiplexing the two streams onto a single waveguide, comprising:

a light source for providing a primary signal;

a first and a second modulator for independently, and in parallel, modulating portions of the primary signal, the first and second modulators for providing two data streams;

means for operating on at least one of the two data streams and for providing different polarization states between the two data streams; and, a birefringent crystal having at least two input ports at an end thereof disposed to receive substantially unguided collimated light from first and second modulators, said unguided collimated light being in the form of two modulated data streams having different polarization states, the birefringent crystal having an output port disposed at an opposite end thereof to receive and combine the two modulated data streams into a single time-interleaved data stream, the birefringent crystal being optically coupled with the modulators in the absence of optical fiber therebetween, the birefringent crystal being of suitable shape and dimensions to provide a required optical path length difference between the two modulated data streams passing therethrough to time multiplex the two data steams into the single data stream whereby birefringent crystal has both a combining function and a time delay function.

13. A method of multiplexing optical signals onto an output port, comprising the steps of:

providing two modulated polarized optical signals having a polarization difference between the two modulated signals of substantially 90 degrees;

passing one of the two modulated signals along a first path in a birefringent crystal; and passing another of the two modulated signals along a second path intersecting the first path at the output port of the birefringent crystal, whereby the modulated signals are combined, wherein the modulated signals are passed to the birefringent crystal in the absence of optical fiber, and wherein the first path and the second path are of different length, whereby the birefringent crystal combines the two modulated signals into a single time-interleaved data stream.

14. A circuit for receiving two streams of data and for time-division multiplexing and interleaving the two streams onto a single waveguide, comprising:

a) modulation means for providing first and second modulated data streams in the form of a first beam and a second beam;

b) means optically coupled with the modulation means for routing and combining the first and second beams in an unguided manner, such that beams of light launched into said means are unguided as they propagate therethrough in the absence of waveguides, said means for routing and combining having at least two input ports optically coupled to receive the first and second beams and having an output port to on which to combine the two beams into a single time-interleaved data stream, the means for routing and combining for providing an optical path length difference along two paths between each of the at least two input ports and the output port for light launched into the at least two input ports on route to the output port to provide a required time delay at the output port between the two data streams such that the data within the data streams is time interleaved having a bit period Dt.

15. A circuit as defined in claim 14, further comprising a voltage controlled attenuator in each waveguide and a means of monitoring the optical power in each of the two beams such that their relative power levels can be adjusted.

16. A circuit as defined in claim 14 wherein the two streams of data are orthogonally polarized, and wherein the means for routing and combining is polarization dependent for combining the two orthogonally polarized data streams in a polarization dependent manner, and wherein the bit period Dt is predetermined.

17. A circuit as defined in claim 14, further comprising a means for relatively orienting the polarization of the two data streams such that they are orthogonally polarized.

18. A circuit as defined in claim 17, wherein the means for routing and combining is polarization dependent for combining the two orthogonally polarized data streams in a polarization dependent manner.

19. A circuit as defined in claim 18, wherein the means for routing and combining is a birefringent crystal.

20. A circuit as defined in claim 18, wherein the means for routing and combining includes a polarization beam combiner.

21. A circuit for receiving two orthogonally polarized streams of data and for polarization and time-division multiplexing the two streams onto a single waveguide, comprising:

polarization dependent means having:

first and second input ports at an end thereof;

an output port optically coupled with the first and second ports;

a first unguided optical path and a second unguided optical path disposed between the first and second input ports respectively and the output port, for receiving the two orthogonally polarized data streams and for carrying said data streams to said output port in an unguided manner, the first and second unguided paths being of a different optical path length which differ by an optical path length DnL, wherein the length dnL, is selected to provide a required relative time delay between the two data streams as they pass along the first and second unguided paths from the first and second input ports to the output port such that the data streams become a single time-interleaved data stream having a predetermined bit period Dt.

22. A circuit as defined in claim 21, wherein Dt=DnL/c.

23. A circuit as defined in claim 22, further comprising a voltage controlled attenuator in each waveguide and a means of monitoring the optical power in each of the two beams such that their relative power levels can be adjusted.

* * * * *